United States Patent
Digiacomo et al.

(10) Patent No.: US 6,301,667 B1
(45) Date of Patent: Oct. 9, 2001

(54) METHOD AND SYSTEM FOR SECURE NETWORK MANAGEMENT OF HIGH-SPEED INTERNET ACCESS CPE

(75) Inventors: Kenneth G. Digiacomo, Manasquan; Satyanarayana Dosapati, Marlboro; Chia-Chang Li, Holmdel; John S. Tsai, Colts Neck, all of NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/168,460

(22) Filed: Oct. 8, 1998

(51) Int. Cl.[7] ............................................. H04L 9/00
(52) U.S. Cl. ...................... 713/201; 713/200; 713/202
(58) Field of Search ................................ 713/200, 201

(56) References Cited

U.S. PATENT DOCUMENTS 5,935,249 * 8/1999 Stern et al. ........................ 713/201
5,958,016 * 9/1999 Chang et al. ...................... 709/229
6,230,190 * 5/2001 Edmonds et al. ................. 709/213
6,243,676 * 6/2001 Witteman .......................... 704/243

* cited by examiner

Primary Examiner—Ly V. Hua
(74) Attorney, Agent, or Firm—Oliff & Berridge, PLC (57) ABSTRACT

A communication system and method utilizing a divided customer Internet Protocol (IP) address space for access customer premises equipment (CPE) addresses and customer personal computer addresses. Both the access CPE and the customer personal computers are located at a customer premises. Using the system and method, Internet service providers can easily implement security measures to deny access to a Network Operation Center (NOC) by communications originating from customer personal computers but allow communications between the NOC and the access CPE.

21 Claims, 5 Drawing Sheets

| DOTTED DECIMAL | BINARY EQUIVALENT |
|---|---|
| 12.0.8.0 | 00001100 00000000 00001000 00000000 |
| SUB-NET MASK 255.255.252.0 | 11111111 11111111 11111100 00000000 |

FIG. 6

| IP ADDRESS | BINARY FORM ADDRESSES |
|---|---|
| (12.0.8.0) | 00001100 00000000 00001000 00000000 |
| (12.0.8.1) | 00001100 00000000 00001000 00000001 |
| (12.0.11.254) | 00001100 00000000 00001011 11111110 |
| (12.0.11.255) | 00001100 00000000 00001111 11111111 |

FIG. 7

| DOTTED DECIMAL | BINARY EQUIVALENT |
|---|---|
| 12.0.8.0 | 00001100 00000000 00001000 00000000 |
| SUB-NET MASK 255.255.254.0 | 11111111 11111111 11111110 00000000 |

FIG. 8

| IP ADDRESS | BINARY FORM ADDRESSES |
|---|---|
| (12.0.8.0) | 00001100 00000000 00001000 00000000 |
| (12.0.10.0) | 00001100 00000000 00001010 00000000 |

METHOD AND SYSTEM FOR SECURE NETWORK MANAGEMENT OF HIGH-SPEED INTERNET ACCESS CPE

BACKGROUND OF THE INVENTION

1. Field of Invention

The present invention relates to a system and method to allow secure network management of high-speed Internet access by network service providers.

2. Description of Related Art

Figure 1:
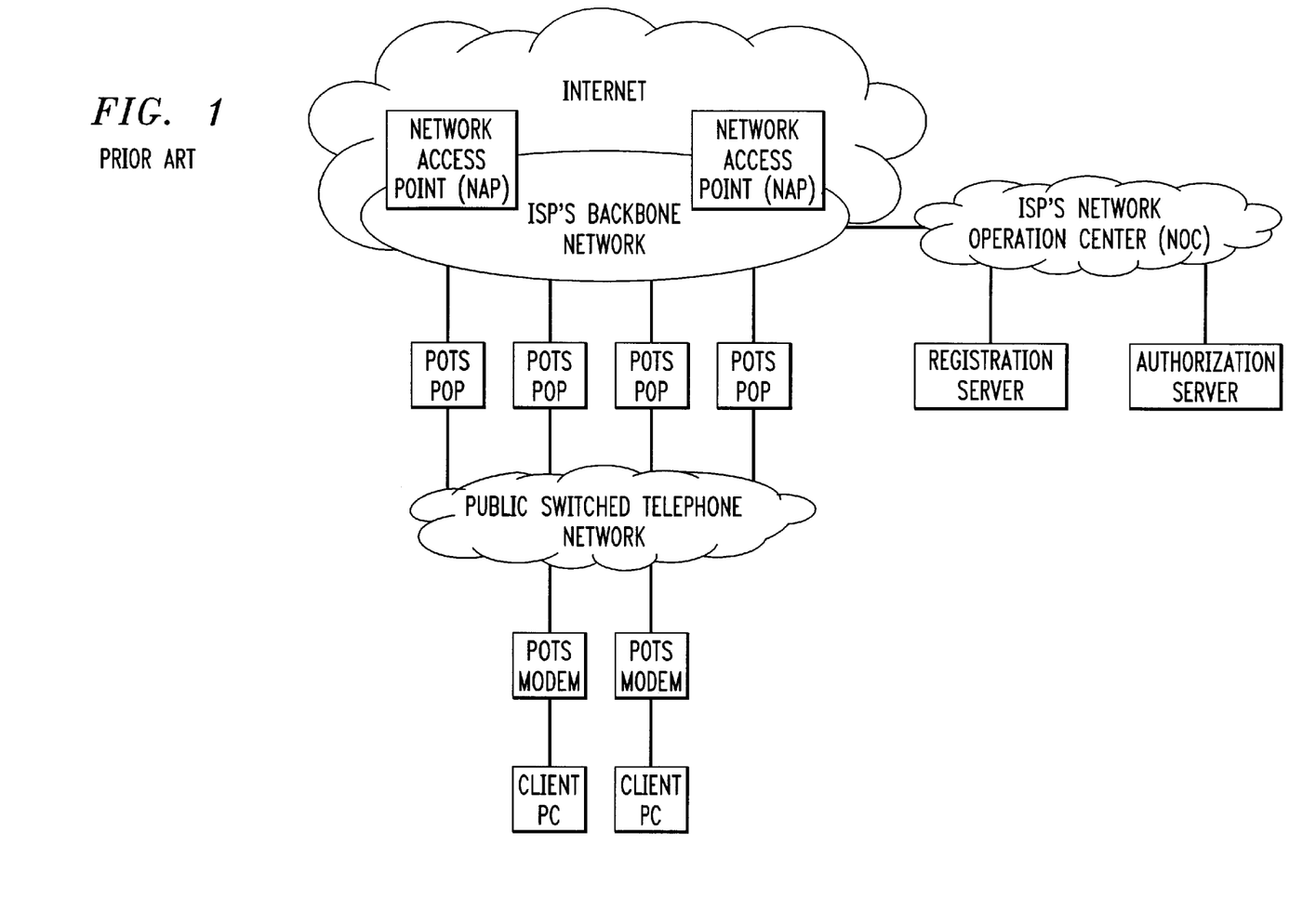

Today, access to the Internet is primarily provided via plain old telephone service (POTS) modem dial-up with speeds ranging from 19.2 Kb/s to 56 Kb/s or via ISDN modems with speeds up to 128 Kb/s. The typical service arrangement requires users to sign up for service with an Internet service provider (ISP) who provides ubiquitous local points of presence (PoPs) used by subscribers to dial into an ISP's backbone network and request service The dial-up PoPs are dispersed geographically to provide wide coverage; however, the PoPs are networked together as an integrated Internet access platform allowing centralized authentication of service requests. Further, networking the PoPs together provides proper network operations and management. FIG. 1 illustrates a typical service architecture as described above.

From an end user's perspective, the Internet access platform provides two main functions: new user registration and per call authentication for Internet access. A new customer can purchase an off-the-shelf POTS modem and dial into a designated number to register for service. The registration process guides the customer through the steps necessary to provision the personal computer (PC), including selection of a default POTS PoP, a dial-up script setup, and an account setup with a registration server and an authentication server. The second function of per-call authentication occurs when a user dials into a POTS PoP requesting access service.

Conventionally, the POTS PoP not only assigns a dynamic IP address to the customer PC to use during an access session but also validates a customer account. An invalid customer account will be denied access to the service. Once the customer account is authenticated, a customer is allowed to browse the Internet using the temporarily assigned Internet Protocol (IP) address for the PC as the source address of the IP packets during communication with any web server. Both the upstream traffic, which travels from the PC to the Internet, and the downstream traffic, which travels from a web site to the PC, pass through the POTS modem.

With advancements in Internet access technology, there are a variety of high speed Internet access systems being developed and implemented today. Presently, cable modem and xDSL are the two main emerging technologies available. Both technologies are commonly referred to as broadband access systems.

Broadband Internet access systems require access customer premises equipment (CPE), for example, cable modems, xDSL modems, 56 Kbps POTS analog dial-up modems located at a customer's premises to provide the proper interface for a transport medium, for example, ethernet cable or DSL, used during broadband Internet access.

Broadband access requires a communication channel with a bandwidth in excess of 1.54 Mbps. Access CPE provide a network interface with the Internet during high-speed access to the Internet using broadband Internet access systems. Customer personal computers are located behind the access CPE and utilize the access CPE as a network interface. The access CPE also serves as a network adapter, router, network management agent and may also serve as an encryption device for encrypting outgoing communications from PCs and other devices located at the customer premises. The access CPE is generally provided by the service provider and is considered part of the network.

Various access arrangements are possible in broadband access systems. For example, a two-way cable modem system (handling upstream and downstream traffic) or a one-way cable modem system handling upstream or downstream traffic) may be provided using cable modem technology. A one-way cable modem system typically uses the POTS modem to provide a path for upstream communication traffic and uses the cable distribution network for the path for downstream communication traffic. A two-way cable modem, on the other hand, uses the cable distribution network as a path for both the upstream and downstream communications traffic. xDSL modems are inherently two-way systems.

Figure 2:
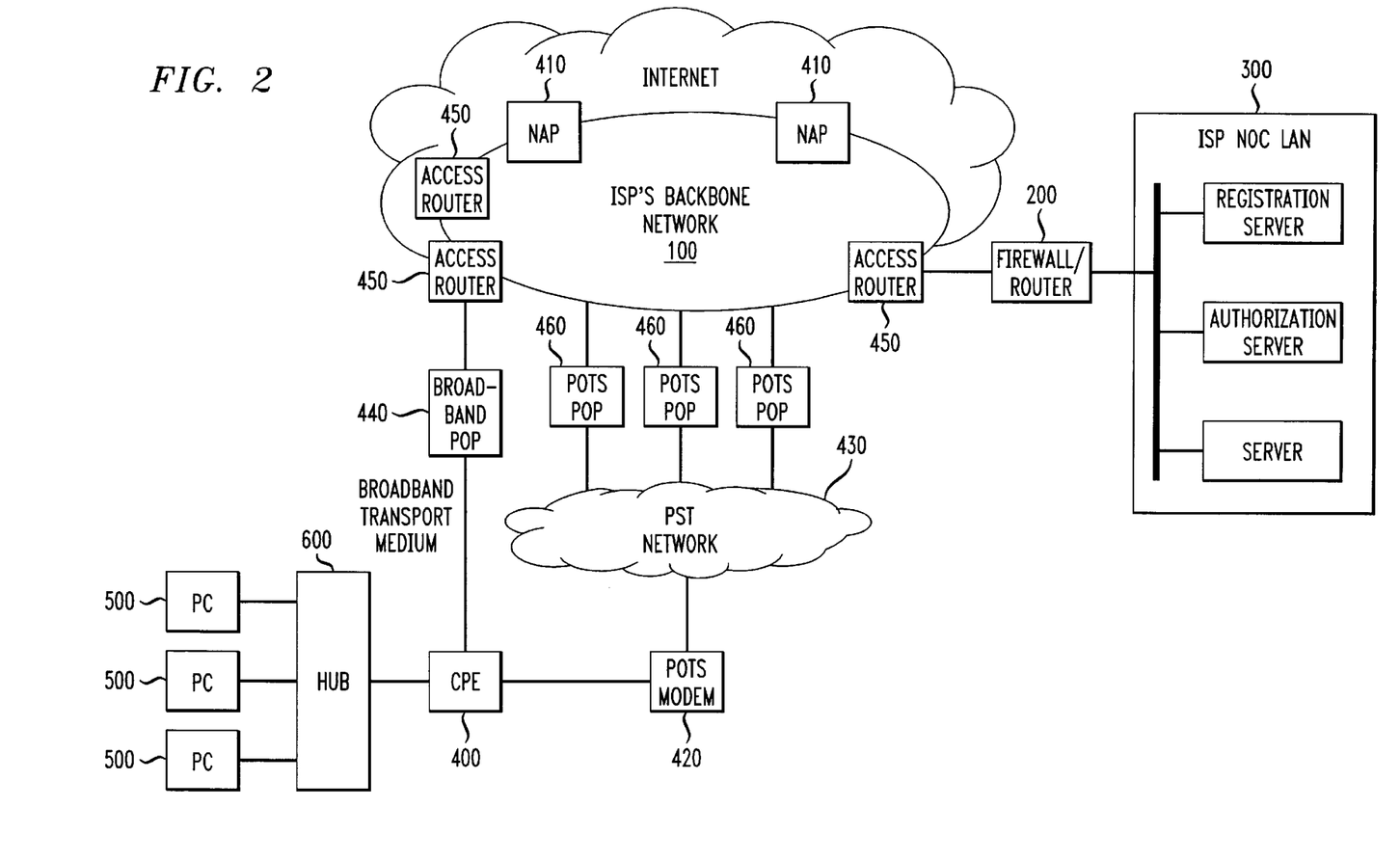
FIG. 2 illustrates an example of a dual-path architecture used by an ISP to deliver Internet access service using POTS PoP and broadband PoP.

Despite differences associated with the various access arrangements, broadband Internet access systems require access CPE located at a customer premises to provide a proper interface with a selected transport medium. FIG. 2 illustrates a typical network arrangement for current broadband, as opposed to POTS, access system.

By introducing the access CPE 400 (e.g., cable modem or xDSL modem) into the broadband Internet access system service architecture, the original POTS modem-based access model is no longer fully applicable for the following reasons.

As shown in FIG. 2, the access CPE 400 and a plurality of PCs, or workstations, 500 located at a customer premises each need an assigned IP address in order to connect to the Internet. The assigned IP address may be static or dynamic. Therefore, processes for new customer registration and service provisioning must be redefined. Ideally, new processes should be at a comparable level of simplicity as those of the POTS-modem-based access arrangement illustrated in FIG. 1.

Further, since the access CPE 400 not only serves as a network adapter providing the proper transport medium interface but also may provide routing and network management functions, the access CPE 400 has capabilities with which the ISPs can extend ISP network management capabilities to customer premises. The benefit of this extension is that the ISP can better monitor the condition of the ISP network extending as far into the customer premises as the high speed transport medium which is owned by the ISP. By extending the network management functions, the ISP can better monitor the condition of, for example, the cable modem or xDSL modem. For conventional POTS modem based access, it is not possible to provide such extensive monitoring.

As shown in FIG. 2, at the customer premises, a plurality of PCs or workstations 500 are connected to each other and any external networks via a hub 600 which couples the PCs 500 to the access CPE 400. The access CPE 400 is coupled to a network to a broad-band point of presence (PoP) 440 via a broadband transport medium to provide broadband communication with the Internet. The access CPE 400 is also coupled to a POTS modem 420 for communication with the Internet. The POTS modem is coupled to a public switched telephone network 430. The public switched telephone network 430 is coupled to at least one POTS PoP 460. The broad-band PoP 440 is coupled to an ISP's backbone network 100 using an access router 450. The backbone network 100 is the major transmission path for network interconnection. The POTS PoP 460 are also connected to the backbone network 100. The network 100 includes various other access routers 450 to other broadband access PoPs. An access router is also used to couple the network 100 to a firewall/router 200. The firewall router 200 is also coupled to a network operation center (NOC) 300. The NOC 300 is a large area network and includes various servers including a registration server, an authorization server and other servers necessary for the maintenance and operation of the ISP. The network 100 also includes network area points (NAP) 410 that provide connections between the network 100 and the Internet to provide communication between the customers utilizing the PCs or workstation 500 and the Internet.

As shown in FIG. 2, the access CPE 400 and the network 100 are connected and communicate with each other using two paths, i.e., one path providing broadband access through the broadband transport medium, broadband PoP 440 and access router 450 and the other path through the public switched telephone network 430 and the POTS PoP 460. This dual-path architecture provides improved Internet access because, for example, a PC 500 can send information to the Internet, i.e., up-stream, using the POTS PoP 460 and receive information from the Internet, i.e., down-stream, using the broadband PoP 440 path. Therefore, this dual-path architecture allows a PC 500 to send the relatively small amount of information required to access the Internet along the POTS PoP 460 path and receive significantly larger amounts of information, e.g., during down loading of information from the Internet, using the broadband PoP 440 path. Thus, the dual-path architecture may provide higher speed surface by utilizing the broadband technology to increase down loading of information.

SUMMARY OF THE INVENTION

In this dual-path architecture system, the access CPE 400 provides a means to extend network management functions to the customer premises and improve service to the customer. The ISP interacts with the access CPE 400 from the NOC 300 connected to the network 100 to monitor and collect performance data directly from the access CPE 400 at the customers' premises.

However, the ISP needs to permit access to the NOC 300 by the access CPE 400 during the new customer registration process and the per-call authentication for Internet access. Therefore, the access CPE 400 must be permitted to send information upstream to the NOC 300. However, the PCs 500 must be denied access to the NOC 300 to ensure proper security of the NOC 300. Although it is foreseeable that the ISP may access the NOC 300 by the access CPE 400 along the broadband PoP 400 path, presently, it is more effective for the ISP to access the NOC 300 using the access CPE 400 along any of the POTS PoP 460. Regardless, because of the dual-path architecture, there is a risk that the customer PCs may gain access to the NOC 300 utilizing the POTS upstream path or the broadband down-stream path to gain access to the Internet through the backbonenetwork 100 and attempt access to the NOC 300 through the Internet. Thus, it is advantageous to provide for communication between the access CPE 400 and the NOC 300 but disadvantageous to provide access to the NOC 300 by customer PCs 500 located at the customer premises. Therefore, the ISP needs to implement security measures to protect the NOC 300 from non-authorized communications from the customer PCs 500, i.e., hacking, through both the broadband PoP 440 path and the POTS PoP 460 path.

The present invention is related to a system and method for performing packet filtering by the firewall router at the NOC using the IP addresses assigned to the access CPE and the customer PCs. The present invention relates to a system and method enabling secure network management of high-speed Internet access by network service providers. More specifically, the present invention uses separate and distinct IP addresses assigned to customer PCs and access CPEs to extend network operation management onto the access CPEs while ensuring secure network management.

BRIEF DESCRIPTION OF THE DRAWINGS

The preferred embodiment of the invention will be described with reference to the accompanying drawings, in which like elements are designated by like numbers and in FIG. 1 illustrates an example of typical architecture used by an ISP to deliver conventional Internet access using POTS PoP.

DETAILED DESCRIPTION OF PREFERRED EMBODIMENTS

Hosts on the Internet communicate by passing packets between them. All hosts on the Internet have a unique IP address. Packets contain both the address of the source of the packet and address of the packet destination. For small, uncomplicated sites, filtering based on IP address is the most common and easiest procedure for ensuring security. However, conventional packet filtering to provide security in the firewall/router 200 with a dual-path architecture is significantly more complicated than packet filtering used with a single POTS PoP path because an IP address pool designated for customer premises must be divided between the customer PCs 500 and the access CPE 400. This IP address pool division is not necessary in today's modem dial-up architecture because only customer PCs 500 are assigned IP addresses, either statically or dynamically, and the POTS modem is not assigned an IP address. Therefore, the dual-path architecture requires using significantly more complex filtering rules in the firewall/router 200.

For example, assume that the plurality of PCs or workstations 500 each have IP addresses assigned from a common address pool. Setting up filtering rules on the firewall/router 200 to filter packets based on IP addresses assigned from a common IP address pool requires that the IP address of each access CPE 400 and PC 500 must be entered and used as part of the implemented filtering rules on the firewall/router 200. This is performed by installing the packet filtering firewall/router 200 at the junction with the backbone network 100 and configuring the packet filtering rules in the firewall/router 200 to block or filter protocols and IP source addresses.

Figure 3:
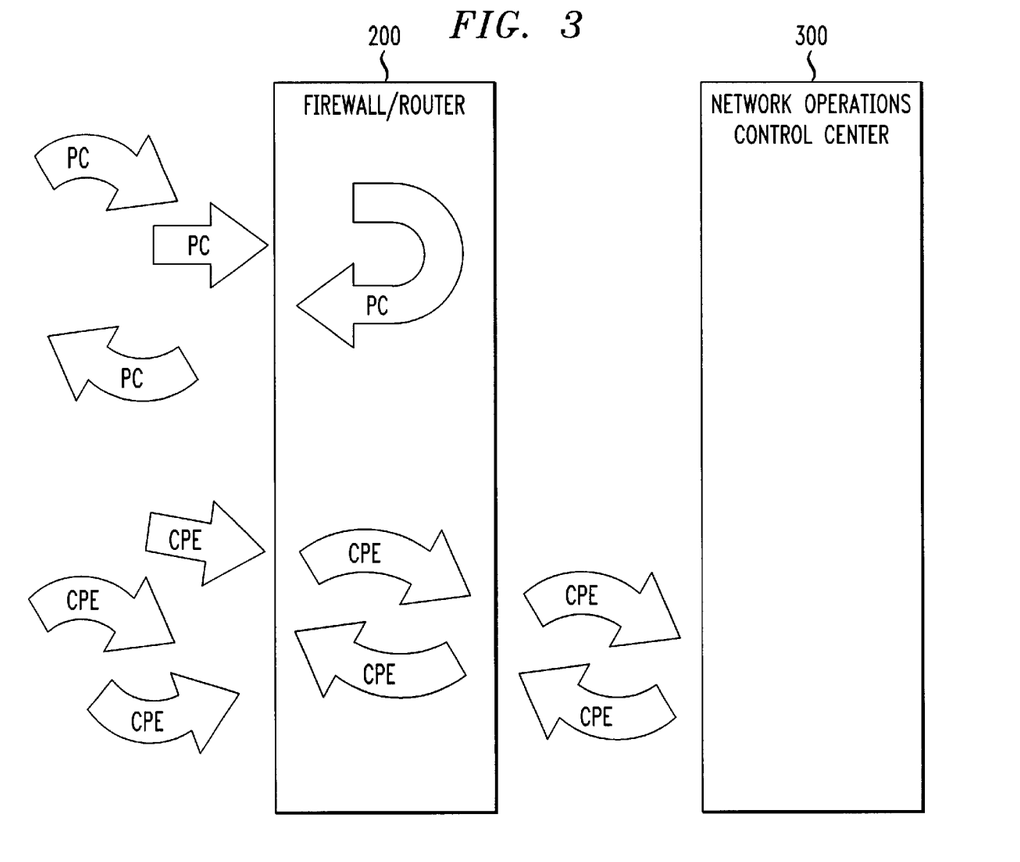
FIG. 3 illustrates the conceptual operation of a firewall/router used to provide network security to a NOC.

As shown in FIG. 3, incoming packets are filtered by the firewall/router 200 by analyzing the source IP addresses contained in TCP/IP fields of the packet header. TCP/IP is one type of communications protocol used by the Internet. Using the firewall/router 200, those packets with source IP addresses indicating the access CPE 400 as the source are allowed access to the NOC 300. Those packets with source IP addresses indicating the customer PCs 500 as the source are denied access. Therefore, incoming packets are filtered based on the source IP address contained in the header.

However, when the access CPE 400 and the customer PCs 500 are assigned IP addresses from a common IP address pool, there is no easy way for the firewall/router 200 to differentiate packets originated from the access CPE 400 and the customer PCs 500. The filtering rules are extremely complex depending on the number of PCs 500 and the quantity of access CPE 400 located on the customer premises. These complex filtering rules make it extremely difficult to provide adequate security for the NOC 300 while maintaining the necessary communication between the access CPE 400 and the NOC 300 to provide proper operation of the backbone network 100.

A block of IP addresses is reserved for a particular customer premises. Although the entire IP address conveys useful information during routing of packets, NOC 300 security only requires determining whether a packet should be admitted to the NOC 300 by determining whether the source of the packet is the access CPE 400 or the customer PCs 500. It should be understood that the firewall/router 200 may have many other filtering rules directed to providing security against infiltration from sources other than the PCs 500.

As discussed above, conventionally, when an access CPE 400 and the customer PCs 500 are assigned IP addresses from a common IP address pool, there is no easy way for the firewall/router 200 to differentiate the access CPE's IP address from that of the customer PCs. In order to provide adequate security, each access CPE's or PCs' IP address has to be entered and used to implement the complex filtering rules on the firewall/router 200.

In a preferred embodiment of the invention, the block of IP addresses is subdivided into a plurality of subnetworks using a subnetwork mask as discussed below. This subnetworking provides a mechanism for implementing simplified filtering rules on the firewall/router 200.

A subnetwork mask is a 32 bit value that contains a number of bits set to 1 (indicating the network portion of an address) followed by a number of bits set to 0 (indicating the host portion of an address). The 32 bit value may also be written in what is called dotted decimal notation, e.g., four decimal integers separated by periods(e.g., 192.77.203.5).

Figure 4:
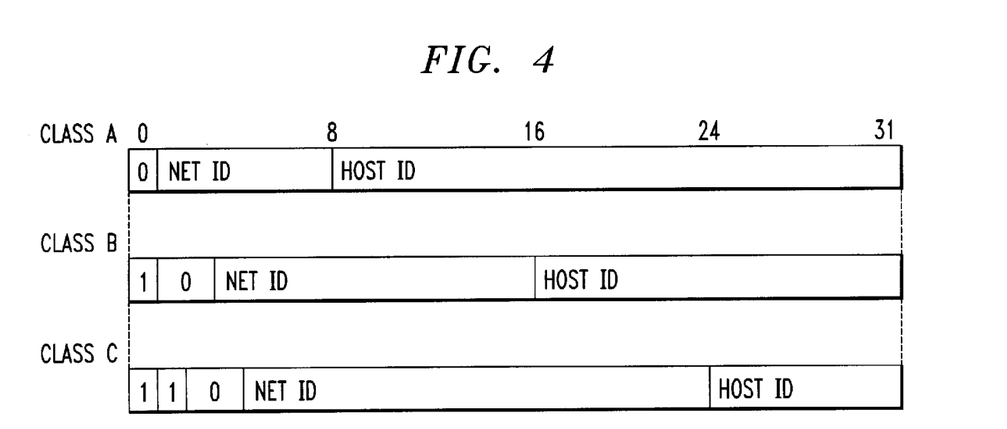
FIG. 4 illustrates three typical classes of IP addresses.

IP addresses are also 32 bits long and are generally written in dotted decimal notation. A 32 bit address is divided into two portions: a network portion and a host portion. The network portion indicates the network to which the host is attached. Industry standards have defined several ways to divide the 32-bit stream. FIG. 4 illustrates 3 classes of IP addresses. The position of the line separating each network portion from each host portion is determined by the first few bits of the address. For example, for a class A address, the first bit is 0 and the line is at bit 8. The class A address contains 126 networks ($2^7$ networks excluding the first and the last addresses, 0000000 and 1111111 which are reserved by standards). However, each class A network can contain as many as 16,777,214 PCs ($2^{224}$ excluding the first and the last host IDs which are reserved). Class B and C can contain many more networks and fewer PCs.

In practice, large networks such as class A networks are not used as single networks. Instead, the networks are subdivided into smaller subnetworks to provide easier maintainability. This subnetworking is performed using the subnetwork mask which directs a routing device as to how to firther subdivide the host ID portion of an IP address.

For example, a subnetwork mask of 255.255.255.0 applied to a Class B network indicates that the network is subdivided into 254 subnetworks of 254 nodes each. Therefore, a class B address 128.5.63.28, without subnetworking, would include a network ID of 128.5.0.0 because the first two bytes are the network ID portion and the last two are the host ID portion. The host is the 284-th (i.e., 256+28) on the network. By using a 255.25.255.0 subnetwork mask, the host becomes the $28^{th}$ host on the subnetwork 63 of the 128.5.0.0 network. The class B network is subdivided into 254 subnetworks (256 excluding the first and the last addresses) each containing 254 hosts (256 excluding the first and the last addresses).

By using the host address bits as additional network address bits, an IP address pool network can be subdivided into subnetworks. Each of these subnetworks obtains a unique network ID. By assigning IP addresses for the access CPE 400 from one subnetwork and assigning the IP addresses for the PCs from a different subnetwork, a router or firewall/router 200 can easily implement filtering rules based simply on the subnetwork ID. These filtering rules need only analyze the host address bits of the IP address to differentiate between the PCs 500 and the access CPE 400. Therefore, these filtering rules allow packets from the access CPE 400 to access the NOC 300 through the firewall/router 200 but deny access of packets from the customer PCs 500.

In this way, the ISP allows messages to be transferred to the Internet from the customer PCs 500 but does not allow messages from the customer PCs 500 to enter the NOC 300. The firewall/router discards those messages originating from the customer PCs 500 and the TCP/IP software stack contained in the PCs 500 notifies the customer PC 500 that the destination, i.e., the NOC 300, is not available as a destination.

The IP addresses of the PCs 500 are stored in the TCP/IP software stack in the memory on the PCs 500 and are also stored in servers, for example, domain name servers or dynamic host configuration protocol servers (DHCPS) in the NOC 300. The servers store, alter and otherwise maintain the IP addresses of the PCs 500 and access CPE 400. Alternatively, the servers may be physically located away from the NOC 300.

By utilizing subnetworking by subnetwork masks, the filtering rules on the firewall/router 200 need only analyze the TCP/IP fields to determine which type of device, i.e., a customer PC 500 or an access CPE 400, produced the packet. If the firewall/router 200 determines that the source of the packet is a first subnetwork, the firewall/router 200 allows access to the NOC 300; otherwise, the firewall/router denies access to the NOC 300, discards the message from the customer PC 500 and signals the TCP/IP software stack to notify the customer PC 500 that the destination, i.e., the NOC, is not available.

The IP addresses may be assigned to the PCs 500 and access CPE 400 dynamically or statically. The only constraint is that all PC IP addresses must be confined to a subnetwork, or a set of subnetworks, and all access CPE 400 IP addresses must be confined to a different subnetwork.

The separation of the access CPE 400 and customer PC 500 IP address space facilitates easy filtering rules on the firewalls/router of a dial platform (DP) NOC. The following examples illustrate the operation of the present invention. Depending on the potential number of access CPE 400 devices and customer PCs 500, the address pool can be subdivided into subnetworks using different subnetworking masks.

EXAMPLE 1

Assume the broadband ISP has been allocated in IP address pool 12.0.8.0/22 as the customer IP address space containing addresses from 12.0.8.1 through 12.0.11.255. "22" indicates the number of bits assigned as the network ID. Both the access CPE and the customer PCs are assigned IP addresses from this address pool.

Figure 5:
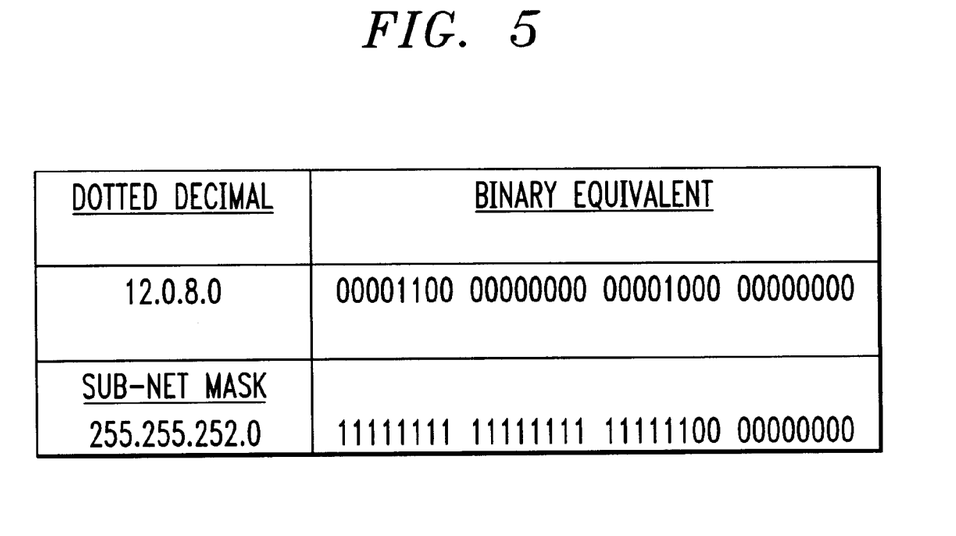
FIG. 5 illustrates the relationship between a network IP address pool 12.0.8.0/22 and a 22 bit subnetwork mask.
Figure 6:
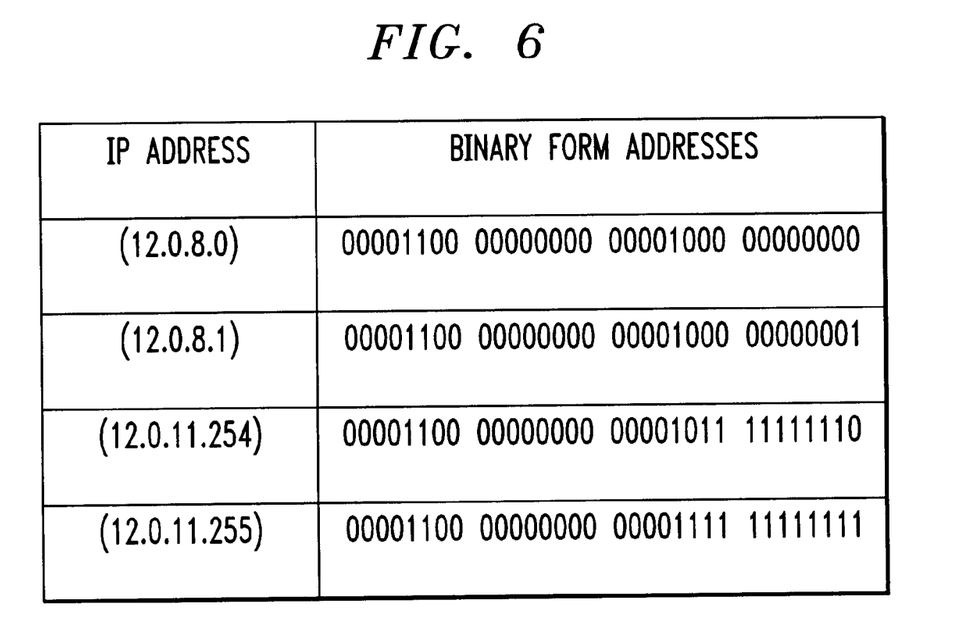
FIG. 6 illustrates constituent IP addresses of the IP address pool illustrated in FIG. 5.

Subnetworking a network does not have to be performed on a byte boundary. For example, as shown in FIG. 5, the IP address 12.0.8.0/22 corresponds to a class A network using a 22-bit subnetwork mask, meaning 22 bits are 1s and the rest are 0s in the subnetwork mask. The first 22 bytes are for network identification and the last 10 bits are for host identification. Therefore, the network 12.0.8.0/22 covers the address pool from 12.0.8.1 to 12.0.11.254 assignable addresses. FIG. 6 illustrates the IP addresses in binary form. IP addresses 12.0.8.0 and 12.0.11.255 are excluded because 12.0.8.0 is reserved by industry standards as the network ID and 12.0.11.255 is reserved as the broadcast address for this network.

EXAMPLE 2

Figure 7:
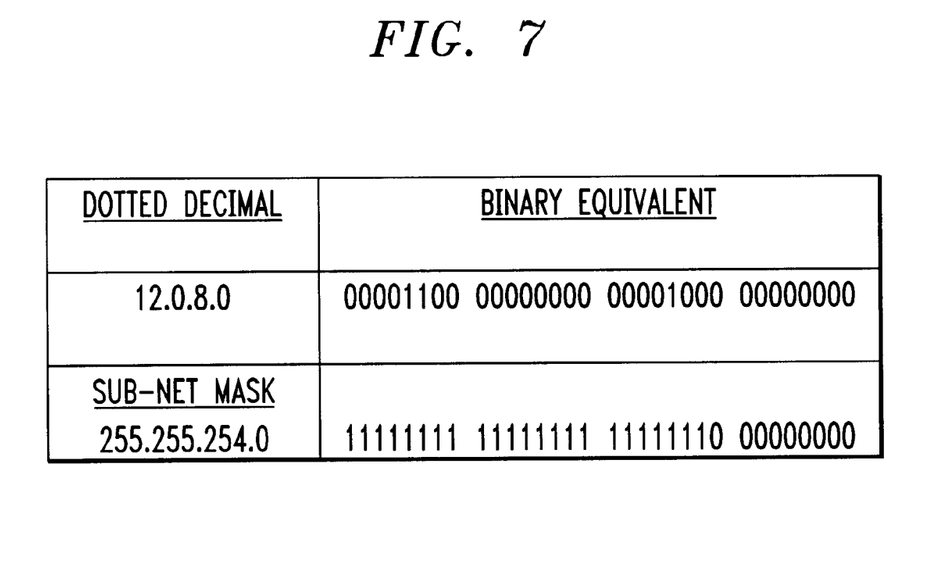
FIG. 7 illustrates a network address configuration if a 23-bit subnetwork mask is used to subdivide the network.
Figure 8:
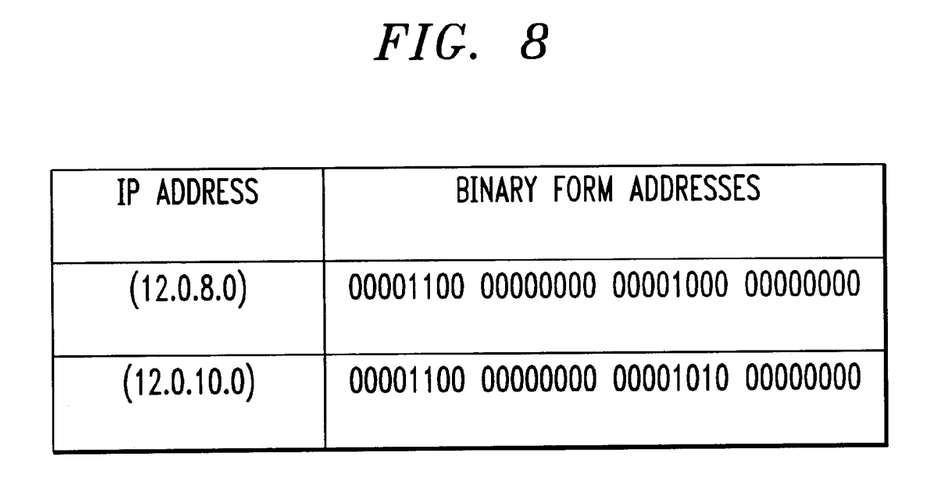
FIG. 8 illustrates the IP address pool, 12.0.8.0/22, subdivided into two subnetworks 12.0.8.0/23 and 12.0.10.0/23.

In this example, the space is equally distributed between the access CPE 400 and the customer PCs 500. The address pool is subnetworked using a 23-bit subnetwork mask. The address pool is divided into two subnetworks identified by: 12.0.8.0/23 and 12.0.10.0/23. FIG. 7 illustrates a network address configuration if a 23-bit subnetwork mask is used to subdivide the network. The original address space, 12.0.8.0/22, is subdivided into two subnetworks, 12.0.8.0/23 and 12.0.10.0/23, as shown in FIG. 8.

Each subnetwork has address space to contain 126 hosts ($2^9$-excluding the reserved first address 000000000 and last address 111111111) with the host ID from 000000001 to 111111110. On the firewall/router 200, filtering rules can be set up to allow or deny a particular subnetwork, 12.0.08.0/23 or 12.0.10.0/23.

EXAMPLE 3

If the number of access CPEs 400 is much fewer than the number of customer PCs 500, for example, a ratio of 1 to 3, then the address space is logically divided using a 24 bit subnetwork mask. Using a 24 bit subnetwork mask on the 12.0.8.0/22 space divides the IP address pool into four subnetworks: 12.0.8.0, 12.0.9.0, 12.0.10.0 and 12.0.11.0. Any one of the subnetworks can be designated for the access CPE 400 (e.g., 12.0.9.0/24) and the rest of the subnetworks can be designated for the customer PCs 500 (i.e., 12.0.8.0/24, 12.0.10.0/24, and 12.0.11.0/24).

The filtering rules on the firewall/router 200 can be set up to allow access to the NOC by the packets for the subnetwork allocated for the access CPE (i.e., 12.0.9.0/24) only, and deny access for packets from other subnetworks (i.e., 12.0.8.0/24, 12.0.10.0/24, and 12.0.11.0/24).

Although the present invention has been described in relationship to a one-way cable modem system, the present invention is not limited to the embodiments presented herein. Accordingly, the present invention may be utilized in any broadband access system access arrangement. Further, the preferred embodiments as set forth herein are intended to be illustrative, not limiting. Various alterations may be made without departing from the spirit and scope of the invention.

What is claimed is:

1. A method for enabling secure network management of high-speed Internet access utilizing a security device at a junction between a communication network and a network operations center, the communication network being coupled to a customer premises equipment and a customer personal computer, the network operations center managing operation of the communication network, the method comprising:

reserving an Internet protocol address pool containing Internet protocol addresses for assignment to the customer premises equipment and the customer personal computer, the Internet protocol addresses each comprising a network portion and a host portion;

assigning a first Internet protocol address subnetwork to the customer personal computer and assigning a second Internet protocol address subnetwork to the access customer premises equipment;

receiving communication packets in the security device from the network, the communication packets including identification of the Internet protocol address subnetwork of a source of the communication packet; and distinguishing a communication packet sent by the customer personal computer from a communication packet sent by the access customer premises equipment based only on identification of the Internet protocol address subnetwork of the source of the communication packet.

2. The method of claim 1, wherein the distinguishing step comprises filtering communication packets received by the security device using filtering rules at the security device to prohibit access to the network operations center by communication packets sent by the personal computer based on the host portion of an Internet protocol source address of a received communication packet.

3. The method of claim 1, wherein the method is performed in a dual-path architecture access network.

4. The method of claim 1, wherein the security device is a firewall provided within a router.

5. The method of claim 1, wherein the personal computer Internet protocol address is assigned statically.

6. The method of claim 1, wherein the personal computer Internet protocol address is assigned dynamically within the Internet protocol address pool subnetwork assigned to the personal computer.

7. The method of claim 1, wherein the distinguishing step is performed by the security device by analyzing the identification of the Internet protocol address subnetwork contained in a header of the communication packet.

8. The method of claim 1, further comprising subdividing the Internet protocol address pool into a plurality of subnetworks using a subnetwork mask to provide a plurality of Internet protocol address subnetworks including the first and second Internet protocol address subnetworks.

9. The method of claim 8, wherein the Internet protocol addresses contain 32 bits and the subnetwork mask is a 32 bit value that contains a number of bits that indicate a network portion of the Internet protocol address followed by a number of bits that indicate the host portion of the Internet protocol address.

10. The method of claim 8, wherein the subdividing step subdivides the host portion of the Internet protocol address using the subnetwork mask.

11. The method of claim 1, wherein the distinguishing step based only on identification of the Internet protocol address subnetwork of the source of the communication packet comprises analyzing only the host address portion of the Internet protocol address to differentiate between the communication packets from the personal computer and the communication packets from the access customer premises equipment.

12. The method of claim 1, further comprising:

discarding communication packets from the personal computer that were denied access to the network operation center by the security device; and notifying the personal computer that the network operations center is not an available destination for communication packets from the personal computer using a software stack stored in the personal computer.

13. The method of claim 1, further comprising storing the Internet protocol address assigned to the personal computer in a software stack in a memory of the personal computer and storing the Internet protocol address assigned to the personal computer in a server coupled to the network operations center.

14. A system for providing secure network management of high-speed Internet access, the system comprising:

means for reserving an Internet protocol address pool containing Internet protocol addresses for assignment to customer premises equipment and a customer personal computer, the Internet protocol addresses each comprising a network portion and a host portion;

means for providing security at a junction between a communication network and a network operations center, the communication network being coupled to the customer premises equipment and the customer personal computer, the network operations center managing operation of the communication network;

means for subdividing the Internet protocol address pool into a plurality of subnetworks using a subnetwork mask to provide a plurality of Internet protocol address subnetworks;

means for assigning a first Internet protocol address subnetwork to the customer personal computer and assigning a second Internet protocol address subnetwork to the access customer premises equipment;

means for receiving communication packets in the security device from the network, the communication packets including identification of the Internet protocol address subnetwork of a source of the communication packet; and means for distinguishing a communication packet sent by the customer personal computer from a communication packet sent by the access customer premises equipment based only on identification of the Internet protocol address subnetwork of the source of the communication packet.

15. The system of claim 14, wherein the means for distinguishing filters communication packets received by the means for providing security using filtering rules at the means for providing securing to prohibit access to the network operations center by communication packets sent by the personal computer based on the host portion of an Internet protocol source address of a received communication packet.

16. The system of claim 15, wherein the method is performed in a dual-path architecture access network.

17. The system of claim 15, wherein the personal computer Internet protocol address is assigned dynamically within the Internet protocol address pool subnetwork assigned to the personal computer.

18. The system of claim 15, wherein the distinguishing step is performed by the security device by analyzing the identification of the Internet protocol address subnetwork contained in a header of the communication packet.

19. The system of claim 15, wherein the means for subdividing subdivides the host portion of the Internet protocol address using the subnetwork mask.

20. The system of claim 15, wherein the means for distinguishing based only on identification of the Internet protocol address subnetwork of the source of the communication packet analyzes only the host address portion of the Internet protocol address to differentiate between the communication packets from the personal computer and the communication packets from the access customer premises equipment.

21. The system of claim 15, further comprising:

means for discarding communication packets from the personal computer that were denied access to the network operation center by the means for providing security; and means for notifying the personal computer that the network operations center is not an available destination for communication packets from the personal computer using a software stack stored in the personal computer.

* * * * *